United States Patent [19]

Norbury

[11] Patent Number: 5,192,084

[45] Date of Patent: Mar. 9, 1993

[54] BRUSH SEAL ARRANGEMENT

[75] Inventor: David S. Norbury, Bristol, England

[73] Assignee: Rolls-Royce plc, London, England

[21] Appl. No.: 805,329

[22] Filed: Dec. 10, 1991

[30] Foreign Application Priority Data

Dec. 12, 1990 [GB] United Kingdom ............... 9026971

[51] Int. Cl.$^5$ ............................................. F16J 15/447
[52] U.S. Cl. .................................... 277/53; 277/59;
                                              277/68; 277/168; 415/174.5
[58] Field of Search ............... 277/3, 53, 54–57,
        277/58, 17–21, 59, 67, 70, 133, 167.3, 168, 68;
                                              415/170.1, 174.5

[56] References Cited

U.S. PATENT DOCUMENTS

| | | | |
|---|---|---|---|
| 1,857,961 | 5/1932 | Lamb | 277/57 |
| 2,123,818 | 7/1938 | Wegmann | 277/55 |
| 2,242,673 | 5/1941 | Hanzlik | 277/57 |
| 3,897,169 | 7/1975 | Fowler | 277/53 X |
| 4,046,388 | 9/1977 | Meyer | 277/53 |
| 4,114,058 | 9/1978 | Albaric | 277/59 X |
| 4,273,510 | 6/1981 | Ambrosch et al. | 415/170.1 |
| 4,756,536 | 7/1988 | Belcher | 277/79 X |
| 5,071,138 | 12/1991 | Mackay et al. | 277/53 X |
| 5,074,748 | 12/1991 | Hagle | 415/170.1 |
| 5,106,104 | 4/1992 | Atkinson et al. | 277/1 |

FOREIGN PATENT DOCUMENTS

| | | | |
|---|---|---|---|
| 1024546 | 4/1953 | France | 277/57 |
| 0191374 | 11/1983 | Japan | 277/3 |
| 0180168 | 10/1984 | Japan | 277/53 |
| 0744179 | 6/1980 | U.S.S.R. | 277/3 |
| 2198195A | 6/1988 | United Kingdom . | |

Primary Examiner—William A. Cuchlinski, Jr.
Assistant Examiner—James K. Folker
Attorney, Agent, or Firm—Oliff & Berridge

[57] ABSTRACT

A stepped shaft passes from a high pressure region, through a vented low pressure region and into an intermediate pressure region. The high pressure region is separated from the low pressure region by a first brush seal and the intermediate pressure region is separated from the low pressure region by a second brush seal. The radius of the shaft is greater at the first brush seal than at the second. This second brush seal bears a circumferential flange on its backplate to deflect fluid leaking between the first brush seal and the shaft radially inwards, the radius of the flange is less than the radius of the shaft at the first brush seal.

5 Claims, 3 Drawing Sheets

BRUSH SEAL ARRANGEMENT

FIELD OF THE INVENTION

This invention relates to a brush seal arrangement.

BACKGROUND OF THE INVENTION

In the use of fluid seals between a rotor and a stator a common situation arises where the rotor passes from a high pressure region to a low pressure region and no fluid leakage between the two regions can be accepted. This is a problem because there is always some leakage through any seal between relatively moving parts with a pressure differential across it. In order to eliminate this leakage a region at a lower pressure than either of the other two regions is placed between them and seals placed between this very low pressure region and the high and low pressure regions. As a result fluid will leak from both the high and low pressure regions into the very low pressure region from which the leakage fluid can be ejected.

FIG. 1 shows a stylized longitudinal section through such a known arrangement of brush seals.

Referring to FIG. 1, it has been found that if a rotor 1 rotates in such a way that there are gaps between the seals 2,3 and the rotor 1 it is possible for fluid denoted by the arrow 4 to travel along the surface of the rotor 1 from the high pressure region, through the lowest pressure region and into he low pressure region if the differential pressure across the seal 2 is greater than the differential pressure across the seal 3. This can be prevented by stepping the surface of the rotor 1 so that the radius of the rotor is greater at the seal 3 than at the seal 2 as shown in FIG. 1A.

This is a problem because the relative radii of the rotor at the two seals is often fixed by the design of the apparatus including the rotor and stator, so it may be undesirable or impossible to have the rotor radius at the low pressure seal greater than that at the high pressure seal, making it impossible to prevent leakage across the seals.

This invention is intended to produce a brush seal arrangement at least partially overcoming this problem.

SUMMARY OF THE INVENTION

According to the present invention there is provided a brush seal arrangement comprising first and second brush seals both arranged for rotational movement about an axis relative to a member, the radius of the member adjacent the first brush seal being different from the radius of the member adjacent the second brush seal the member passing from a high pressure fluid region, through a low pressure fluid region into an intermediate pressure fluid region, the first brush seal being arranged to separate the high pressure region from the low pressure region and the second brush seal being arranged to separate the intermediate pressure region from the low pressure region and an element which directs fluid leaking between the first brush seal and the member away from a point where the second brush seal seals against the member.

The element prevents a reverse pressure gradient being generated across the second brush seal by directing the gas flow from the high pressure region away from the contact surface between the second brush seal and the member, preventing the gas flow from the high pressure region from stagnating against the backplate of the second brush seal, and so prevents leakage of fluid from the high pressure region into the low pressure region.

BRIEF DESCRIPTION OF THE DRAWINGS

The prior art has been disclosed in relation to FIGS. 1 and 1A wherein.

Apparatus embodying the invention will now be described by way of example only with reference to FIGS. 2 and 3 of the accompanying diagrammatic drawings in which.

SPECIFIC DESCRIPTION

Figure 1:
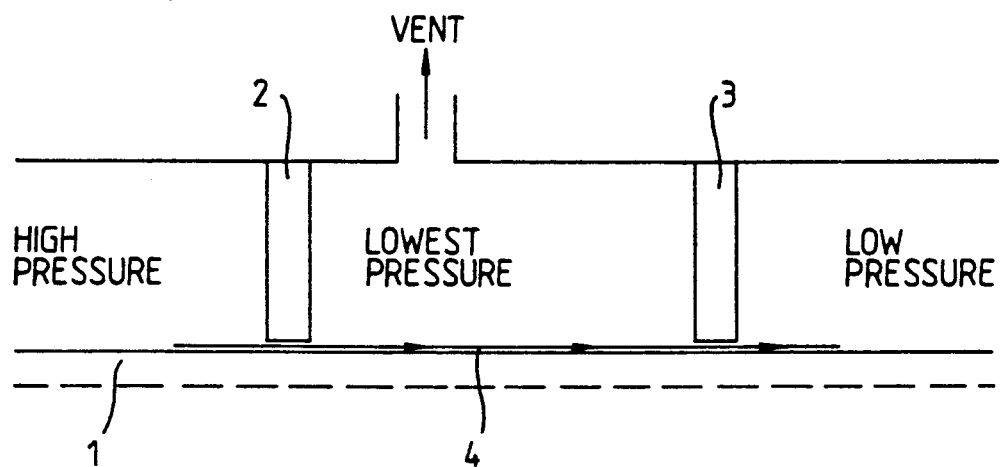
FIG. 1 shows a typical brush seal arrangement between a high pressure fluid channel and a low pressure fluid channel, and FIG. 1A shown the arrangement with the radium of the rotor being greater at the lower pressure side than at the high pressure said by means of a step.
Figure 2:
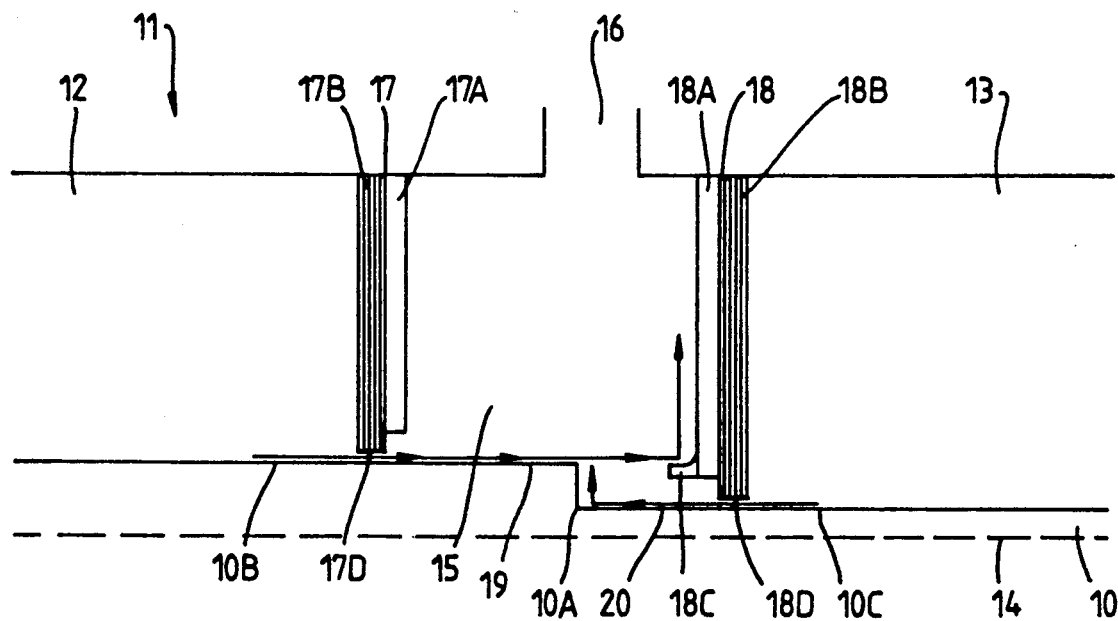
FIGS. 2 and 3 show in stylized longitudinal section first and second brush seal arrangements employing the invention, similar parts having the same reference numerals throughout.
Figure 1A:
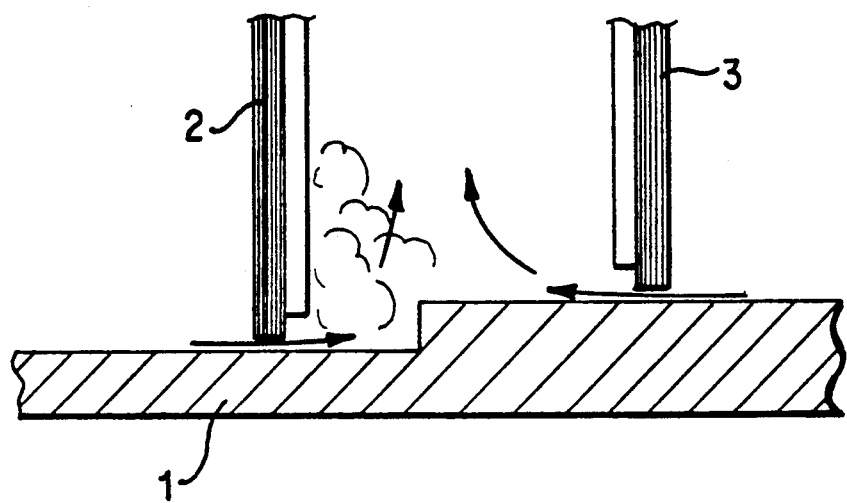
Figure 3:
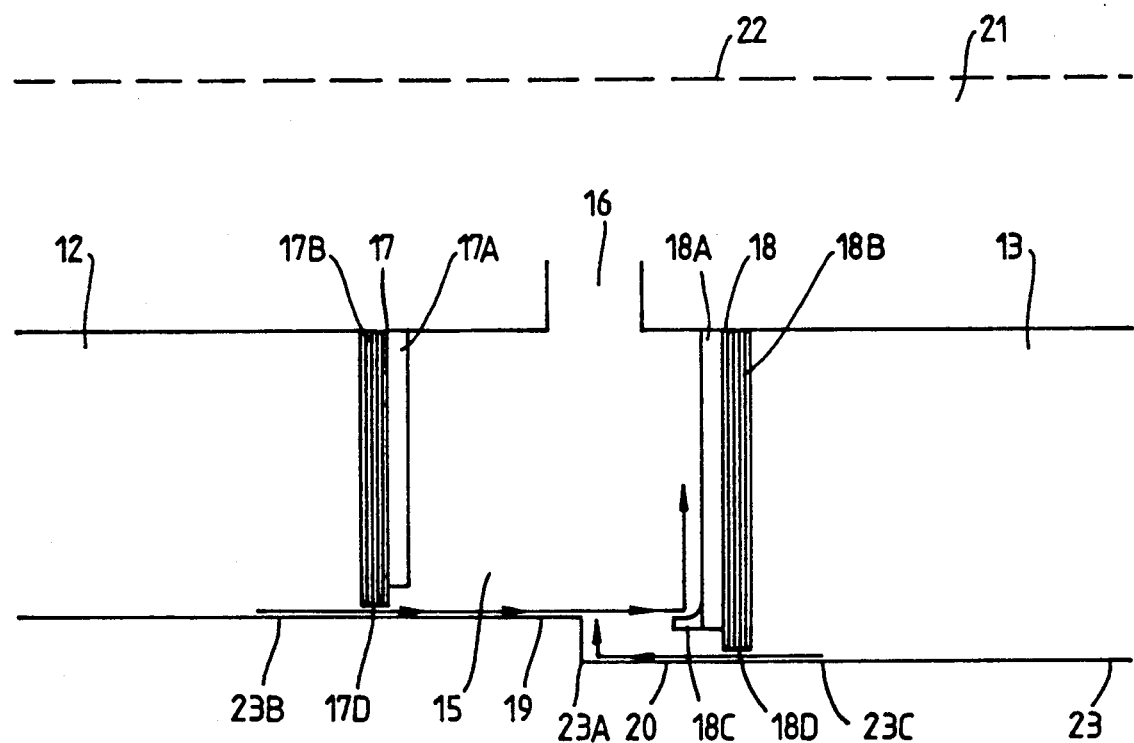

Referring to FIGS. 2 and 3, in a gas turbine engine a rotor shaft 10 rotates about an axis 14 relative to a housing 11. The shaft 10 passes from a hot high air pressure region 12 into a cold intermediate pressure region 13. Penetration of hot air from the region 12 into the cold region 13 will cause damage to the engine and must be prevented.

Accordingly the high pressure region 12 and the intermediate pressure region 13 are separated by a low pressure region 15 connected to the atmosphere by a vent 16. The atmosphere acting as a low sink pressure. A first brush seal 17 seals off the high pressure region 12 from the low pressure region 15, and a second brush seal 18 seals off the intermediate pressure region 13 from the low pressure region 15.

The first brush seal 17 is formed by an annular backplate 17A and a plurality of tightly packed bristles 17B each secured to the housing 11 at one end and in contact with the shaft 10 at its free end. Similarly the brush seal 18 is formed by an annular backplate 18A and a plurality of tightly packed bristles 18B.

The shaft 10 is stepped at a point 10A, dividing it into a first relatively large radius portion 10B in contact with the first brush seal 17 and a second relatively small radius portion 10C in contact with the second brush seal 18.

The backplate 18A bears, on its face exposed to the low pressure region 15, a circumferential deflector flange 18C which runs around the inner edge of the annular backplate 18A and has a radius smaller than that of the portion 10B of the shaft.

When the rotational characteristics of the shaft 10 are such that gaps 17D, 18D opens between the shaft 10 and the bristles 17B, 18B of the brush seals 17 and 18 respectively an annular layer of air 19 escapes through the gap 17D and travels along the surface of the first portion 10B of the shaft 10 while another annular layer of air 20 escapes through the gap 18D and travels along the surface of the second portion 10C of the shaft 10.

The annular layer of air 19 continues beyond the step 10A in the shaft 10 until it strikes the annular backplate 18A of the second brush seal 18. Here this air is prevented from moving radially inwards by the deflector flange 18C and instead moves radially outwards, the radially outermost face of the deflector flange 18C is curved to encourage this radially outward movement.

Simultaneously the annular layer of air 20 travels along the surface of the portion 10C of the shaft 10 until it strikes the step 10A where it is directed radially outwards.

The radially outward flows of air are then vented to atmosphere by way of the vent 16.

Without the flange 18C the annular layer of air 19 would tend to move radially inward as well as outward on striking the backplate 18A, and the portion travelling inward would, under some circumstances, generate a higher pressure adjacent the gap 18D on the region 15 side of the brush seal 18 than the pressure in the second region 13 and so produce a reverse flow of air across the seal 18. Thus an air flow from the region 12 to the region 13 would occur.

It might be expected that where the two air flows 19 and 20 intersect the annular layer of air 19 would be directed radially outwards or broken up by turbulence, but this is not the case.

The brush seals illustrated are greatly simplified, but it is not thought necessary to go into the detailed construction of brush seals because brush seals per se are well known.

The example shown above has the brush seals attached to an outer member and moving relative to an inner member. It would be equally possible to have the brush seals attached to an inner member and moving relative to an outer member, producing the arrangement shown in FIG. 3 where a shaft 21 rotates about an axis 22 within a stepped housing 23. The housing 23 having a step 23A dividing into a smaller radius portion 23B in contact with the first brush seal 17 and a larger radius portion 23C in contact with the second brush seal 18.

The annular backplate 18A of the brush seal 18 bears a flange 18C about its radially innermost edge.

In this case the annular layers of gas 19 and 20 are directed radially inwards by the flange 18C and step 23A respectively and the flange 18C must have a greater radius than smaller radius portion 23B of the housing 23.

The embodiment of FIG. 2 is generally preferred however because less wear is produced by the brush seal being in rubbing contact at the shaft rather than the housing because the distance from the axis of rotation and hence the relative velocity of brush seal and its sealing surface is reduced.

The deflector flange 18C can be integral with or attached to the backplate 18A of the brush seal 18. Alternatively the flange 18C could be separate from the backplate 18A and could be supported by a disk or spokes attached to the housing 11. It is preferred to have the flange 18C supported by the backplate 18A because this is more convenient than adding a separate support structure.

The low pressure region 15 is described as being vented to atmosphere, it could of course be vented to any low sink pressure provided this was lower than the pressures in the high pressure region 12 and intermediate pressure region 13.

The deflector flange 18C shown is perpendicular to the face of the backplate 18A, it could instead be at some other angle to the backplate if preferred. Generally the shape, profile and exact position of the deflector flange 18C for best results will vary from seal to seal depending on the physical parameters of the brush seal.

I claim:

1. A brush seal arrangement to effect sealing between relatively rotating first and second coaxial members which define therebetween an axially extending annular enclosure, the enclosure having in axial sequence a high pressure fluid region, a low pressure fluid region, and a intermediate pressure fluid region having a pressure between that of the high and low pressure regions, the arrangement being provided by first and second radially disposed brush seals secured to the first member, the first seal being located between the high pressure region and the low pressure region, and the second seal being located between low pressure region and the intermediate pressure region, the axial width of the annular enclosure in the high pressure region being less than the axial width of the annular enclosure in the intermediate pressure region, the difference in width being provided by a step in the radius of the second member within the low pressure region, wherein there is provided between the step and the second seal adjacent the distal end of the second seal but spaced from the second member an element adapted to direct high pressure fluid leaking past the first seal away from the contact region of the second seal with the second member.

2. An arrangement as claimed in claim 1, wherein the elemetn is located so as to intercept high pressure fluid flowing under the first seal along the surface of the second member and to direct said fluid radially away from the second member.

3. An arrangement as claimed in claim 1, wherein the second seal is provided with an annular backplate on its low pressure side and secured to the first member, and said element is provided by a circumferential structure cooperating with the distal portion of the backplate.

4. An arrangement as claimed in claim 1, wherein the first member is a housing and the second member is a rotor.

5. An arrangement as claimed in claim 1, wherein the first member is a rotor and the second member is a housing.

* * * * *